United States Patent
Langton

(10) Patent No.: US 9,134,071 B2
(45) Date of Patent: Sep. 15, 2015

(54) EVAPORATIVE COOLER MEDIA KIT AND METHOD OF USE

(75) Inventor: Alan Langton, Sherman, TX (US)

(73) Assignee: Champion Cooler Corporation, Little Rock, AR (US)

( * ) Notice: Subject to any disclaimer, the term of this patent is extended or adjusted under 35 U.S.C. 154(b) by 1317 days.

(21) Appl. No.: 12/851,855

(22) Filed: Aug. 6, 2010

(65) Prior Publication Data

US 2012/0031117 A1   Feb. 9, 2012

(51) Int. Cl.
*F25B 45/00* (2006.01)
*F28D 5/00* (2006.01)
*F24F 5/00* (2006.01)

(52) U.S. Cl.
CPC .............. *F28D 5/00* (2013.01); *F24F 5/0035* (2013.01); *Y02B 30/545* (2013.01)

(58) Field of Classification Search
CPC .............. F24F 5/0035; F24F 6/04; F28D 5/00
USPC .............. 62/317, 77, 259.4, 304; 261/94, 99, 261/100, 107
See application file for complete search history.

(56) References Cited

U.S. PATENT DOCUMENTS

| | | | | |
|---|---|---|---|---|
| 2,079,374 A * | 5/1937 | Kent | ............... | 252/62 |
| 3,363,885 A * | 1/1968 | Meek | ............... | 261/30 |
| 4,612,778 A * | 9/1986 | Medrano | ............... | 62/311 |
| 4,833,896 A * | 5/1989 | Carlson | ............... | 62/304 |
| 2002/0109245 A1 * | 8/2002 | Schuld | ............... | 261/94 |

\* cited by examiner

*Primary Examiner* — Melvin Jones
(74) *Attorney, Agent, or Firm* — RatnerPrestia

(57) ABSTRACT

Evaporative cooler media kits and methods of use are disclosed. The media kit is for providing replacement media for use in one or more of a plurality of evaporative coolers. The media kit comprises a plurality of main media components, a plurality of distribution media components, a first width adjustment component, and a second width adjustment component. The method is for installing replacement media in an evaporative cooler is disclosed. The method comprises arranging a plurality of main media components side by side within the opening of the frame, inserting at least one distribution media component in a first gap extending between a top surface of the main media components and a top of the frame, and inserting at least one width adjustment component in a second gap extending between a side surface of the main media components and a side of the frame.

17 Claims, 5 Drawing Sheets

EVAPORATIVE COOLER MEDIA KIT AND METHOD OF USE

FIELD OF THE INVENTION

This invention relates generally to evaporative coolers, and more particularly to media kits for evaporative coolers.

BACKGROUND OF THE INVENTION

Evaporative coolers work by converting hot air into a cool breeze using the process of evaporating water. Evaporative coolers utilize the natural process of water evaporation along with an air-moving system to create effective cooling. Fresh outside air is pulled through wetted evaporative media that cools the air through water evaporation. A fan then circulates the cool air throughout a room, home, or business.

The effectiveness of an evaporative cooler may depend on the ability of the cooler to move air through the evaporative cooler and the ability of the cooler to promote the evaporation of water into the air flowing through the cooler. Despite current evaporative cooler technologies, there remains a need for improvements to evaporative cooler systems and technologies, in areas such as cost, performance, efficiency, and ease of use or maintenance.

SUMMARY OF THE INVENTION

Aspects of the present invention relate to evaporative cooler media kits and methods of use.

According to one aspect of the present invention, a media kit is disclosed. The media kit is for providing replacement media for use in one or more of a plurality of evaporative coolers. Each of the plurality of evaporative coolers has a frame defining an opening for receiving the replacement media. At least two of the evaporative coolers having openings of different sizes. The media kit comprises a plurality of main media components, a plurality of distribution media components, a first width adjustment component, and a second width adjustment component. At least two of the main media components are configured to be received side by side within the opening of the frame in each of the evaporative coolers. Each of the distribution media components is configured to be positioned on top of the main media components within the opening of the frame in at least one but not all of the evaporative coolers. The first width adjustment component is configured to fill a gap between a side surface of one of the main media components and a side of the frame in at least one but not all of the evaporative coolers. The second width adjustment component is configured to fill a gap between a side surface of one of the main media components and a side of the frame in at least one but not all of the evaporative coolers. The second width adjustment component has a width different from a width of the first width adjustment component.

According to another aspect of the present invention, a method of installing replacement media in an evaporative cooler is disclosed. The evaporative cooler has a frame defining an opening for receiving the replacement media. The method comprises the steps of arranging a plurality of main media components of a replacement media kit side by side within the opening of the frame, inserting at least one of a plurality of distribution media components of the replacement media kit in a first gap extending between a top surface of the main media components and a top of the frame, and inserting at least one of a plurality of width adjustment components of the replacement media kit in a second gap extending between a side surface of the main media components and a side of the frame.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

Although the invention is illustrated and described herein with reference to specific exemplary embodiments, the invention is not intended to be limited to the details shown. Rather, various modifications may be made in the details within the scope and range of equivalents of the claims and without departing from the invention.

Figure 1A:
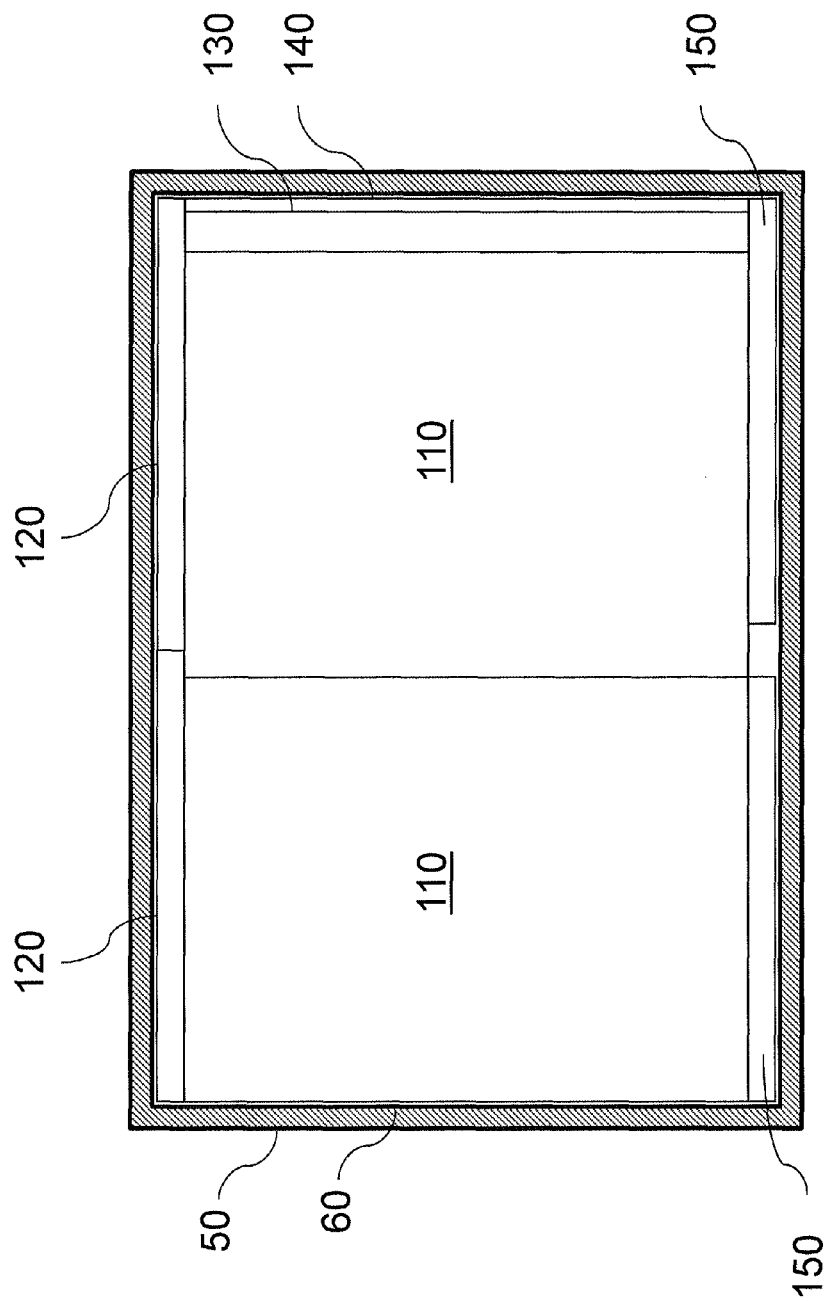
FIGS. 1A-1C illustrate front, top perspective, and bottom perspective views of an exemplary evaporative cooler media assembly in accordance with aspects of the present invention.

The exemplary kits and methods disclosed herein are usable in conjunction with evaporative coolers, such as evaporative cooler 50 in FIG. 1A. Evaporative coolers may use evaporative media in order to cool air. Thus, an evaporative cooler may include a frame which defines an opening for receiving the evaporative media, such as frame 60 in FIG. 1A. The exemplary evaporative media kits of the present invention provide evaporative media for positioning within the opening of an evaporative cooler. The size, shape, or materials of the evaporative media may be selected to promote the evaporation of water contacting the media in order to cool air passing through the evaporative media, as would be understood by one of ordinary skill in the art.

The exemplary kits and methods disclosed herein may be particularly suitable for providing replacement evaporative media to a plurality of different evaporative coolers. Because there are multiple different manufacturers of evaporative coolers, the openings of evaporative coolers may have different sizes. The exemplary evaporative media kits of the present invention include components configured to fill openings of different sizes. Thus, the exemplary media kits may be usable for providing evaporative media to evaporative coolers having openings of different sizes. Exemplary evaporative coolers usable in conjunction with the present invention include, for example, evaporative coolers provided by AdobeAir, Inc., Phoenix Manufacturing, Inc., Essick Air, Inc, and Champion Cooler Corporation.

Figure 1B:
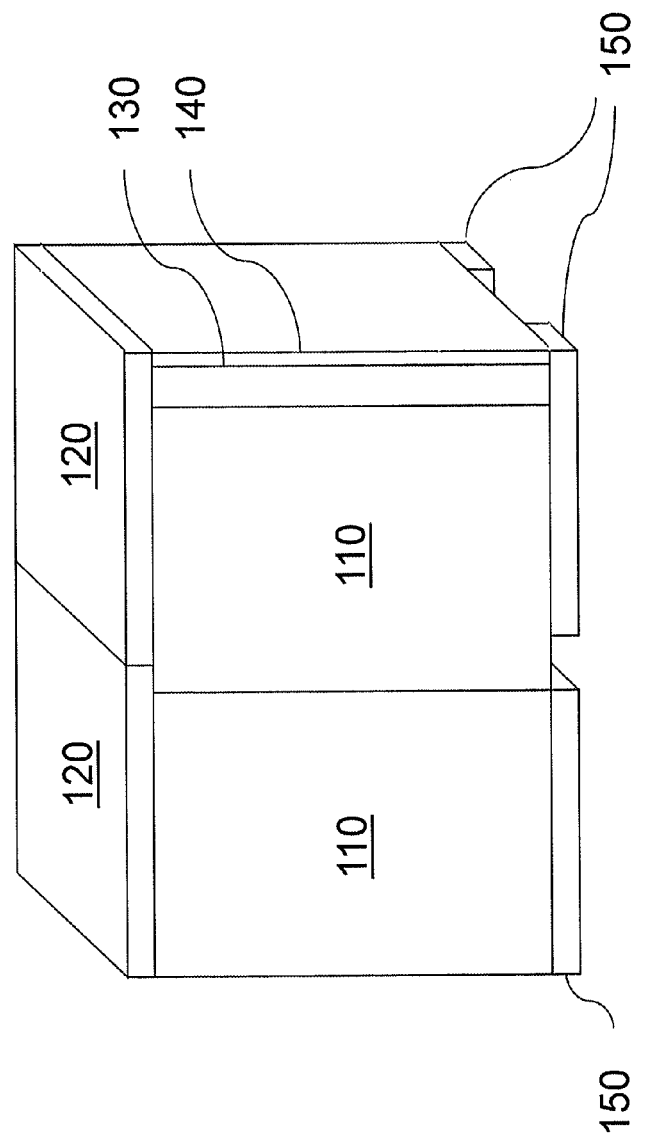
Figure 1C:
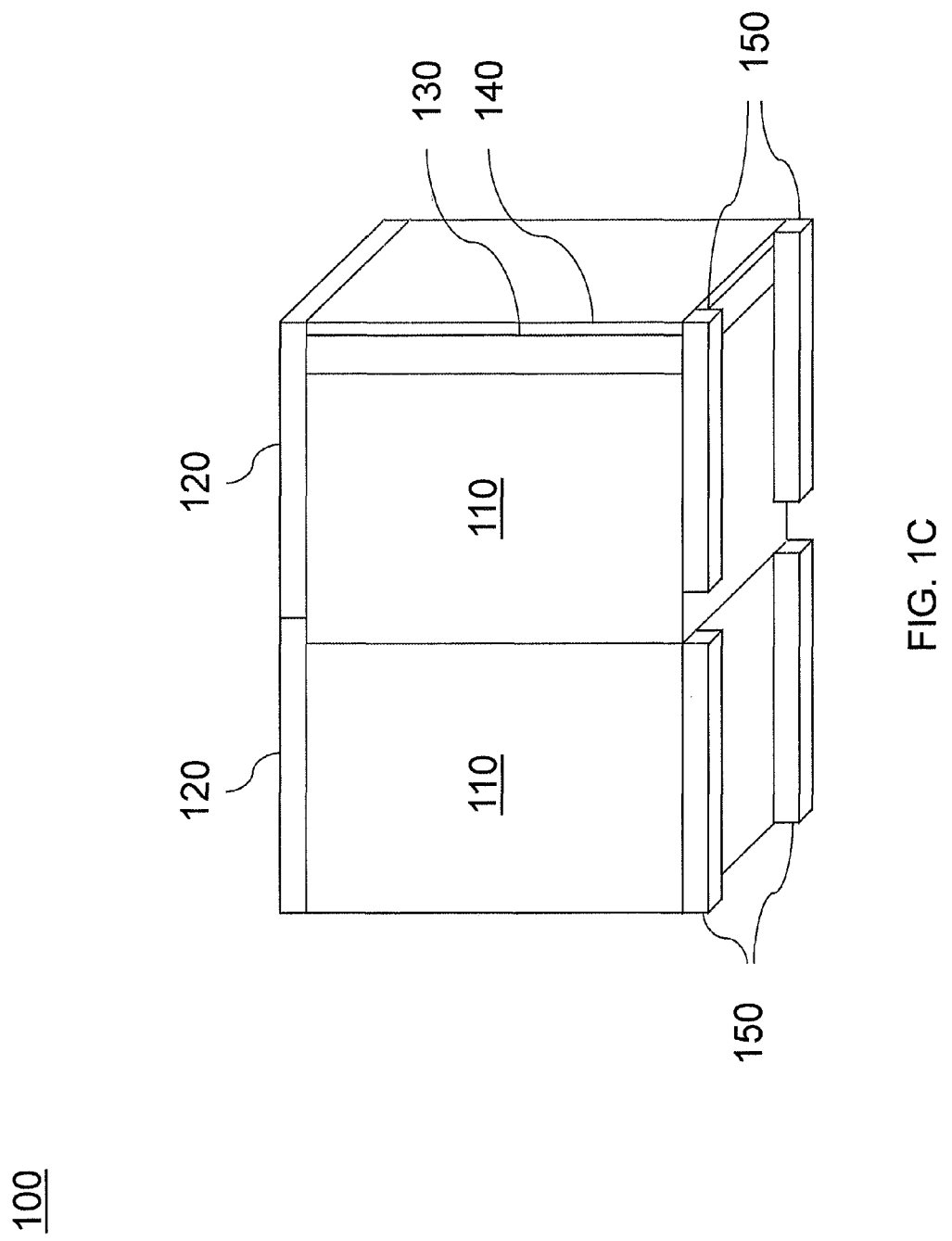

As an overview, FIGS. 1A-1C show an embodiment of an evaporative cooler media assembly, generally referenced by numeral 100, in accordance with an aspect of the present invention. Evaporative cooler media assembly 100 services, or provides replacement evaporative media for filling, a plurality of evaporative coolers. As described above, the evaporative coolers may include a frame defining an opening for receiving the replacement media. The evaporative coolers may have openings of different sizes. Broadly, media assembly 100 includes a plurality of main media components 110, a plurality of distribution media components 120, a first width adjustment component 130, and a second width adjustment component 140. Additional details of media assembly 100 will be provided herein.

Main media components 110 are configured to be received within the opening of the evaporative coolers. In an exemplary embodiment, main media components 110 are sized such that all of the main media components 110 can be positioned side by side within the opening of each evaporative cooler serviced by the media assembly 100. The main media components 110 may optionally be sized such that all of the main media components 110 substantially fill the smallest of the openings of the evaporative coolers. This may reduce the number of additional components necessary for the media assembly to service the remaining ones of the evaporative coolers. Main media components 110 are the largest components of media assembly 100.

Main media components 110 may be formed, for example, from paper or cellulose evaporative media, or from wicking media. Suitable evaporative media for main media components 110 may include CELDEK® evaporative media provided by Munters Europe AB, HumiCool Division, Kung Hans Väg 8, P.O. Box 474, SE-191 24 Sollentuna, Sweden. Other suitable materials for main media components 110 will be understood by one of ordinary skill in the art from the description herein. For example, there are other suppliers of this type of media, including Port-a-Cool, LLC, which supplies media under the KÜÜL® pad name.

Distribution media components 120 are configured to be received within the opening of the evaporative coolers on top of the main media components 110. In an exemplary embodiment, distribution media components 120 are sized such that each of the distribution media components 120 can be positioned on top of the main media components 110 in at least one but not all of the evaporative coolers serviced by the media assembly. Distribution media components 120 may further be sized such that they substantially fill a gap between a top surface of the main media components 110 and the top of the frame of at least one of the evaporative coolers.

Distribution media components 120 may include one or more sub-pluralities of distribution media components, each of the sub-pluralities having a different height for substantially filling different gaps. The sub-pluralities of distribution media components may be sized to service differently-sized openings of respective evaporative coolers.

Distribution media components 120 may be formed from the same materials as main media components 110. Additionally, the height of the distribution media components 120 may be restricted based on the materials used for forming distribution media components 120. For example, distribution media components 120 may have no less than a predetermined height, e.g., 0.5 inches, based on the materials of distribution components 120.

First width adjustment component 130 and second width adjustment component 140 are configured to be received within the opening of the evaporative coolers on the side of the main media components 110. In an exemplary embodiment, first width adjustment component 130 may be sized such that it fills a gap between a side surface of one of the main media components 110 and a side of the frame in at least one but not all of the evaporative coolers serviced by media assembly 100. Similarly, second width adjustment component 140 may be sized such that it fills a gap between a side surface of one of the main media components 110 and a side of the frame in at least another one but not all of the evaporative coolers serviced by media assembly 100. First and second width adjustment components 130 and 140 may have different widths, in order to service differently-sized openings of respective evaporative coolers. First and second width adjustment components 130 and 140 may also be sized such that together they fill a gap between a side surface of one of the main media components 110 and a side of the frame in at least one of the evaporative coolers serviced by media assembly 100.

First and second width adjustment components 130 and 140 may be formed, for example, from STYROFOAM foam. Suitable materials for first and second width adjustment components 130 and 140 will be understood by one of ordinary skill in the art from the description herein and alternative materials can be selected. First and second width adjustment components 130 and 140 may desirably be formed from materials that do not restrict them to a lower limit of width, in order to accommodate the differently sized openings of the plurality of evaporative coolers. However, it may be desirable to form first and second width adjustment components 130 and 140 having a width no less than, for example, 0.5 inches, to prevent width adjustment components 130 and 140 from breaking.

Either one of first and second width adjustment components 130 and 140 may comprise a plurality of width adjustment components. In an exemplary embodiment, a plurality of first width adjustment components 130 may be sized such that together they fill a gap between a side surface of one of the main media components 110 and a side of the frame in at least one but not all of the evaporative coolers serviced by media assembly 100. Each of the plurality of first width adjustment components 130 may have the same width, e.g., 0.5 inches. This may enable first width components 130 to service a number of differently-sized openings of the evaporative coolers.

For example, first width adjustment components 130 may each have a width of 0.5 inches, while a second width adjustment component 140 has a width of 0.25 inches. With this configuration, any number of first width adjustment components 130 may be stacked with the second width adjustment component 140 to achieve an appropriate size to fill a gap. Where a gap is 0.25 inches thick, only the second width adjustment component 140 is used. Where a gap is 0.5 inches thick, only a single first width adjustment component 130 is used. For larger gaps, additional first width adjustment components 130 can be added to incrementally increase the width to be serviced by components 130 and 140.

Media assembly 100 may further include a plurality of height adjustment components 150. Height adjustment components 150 are configured to be received within the opening of the evaporative cooler beneath the main media components 110. In an exemplary embodiment, height adjustment components 150 are sized such that each of the height adjustment components 150 fills a gap between a bottom surface of the main media components 110 and a bottom of the frame of at least one but not all of the evaporative coolers services by the media assembly 100. Height adjustment components 150 may be sized such that only main media components 110 and height adjustment components 150 are needed to substantially fill the opening of a respective evaporative cooler. Alternatively, height adjustment components 150 may be sized such that distribution media components 120, in addition to main media components 110 and height adjustment components 150, are necessary to substantially the opening of a respective evaporative cooler.

Height adjustment components 150 may be formed from the same materials as first and second width adjustment components 130 and 140. Height adjustment components 150 may desirably be formed from materials that do not restrict them to a lower limit of height, in order to accommodate the differently sized openings of the plurality of evaporative coolers.

Figures 1D, 1E, 1F:
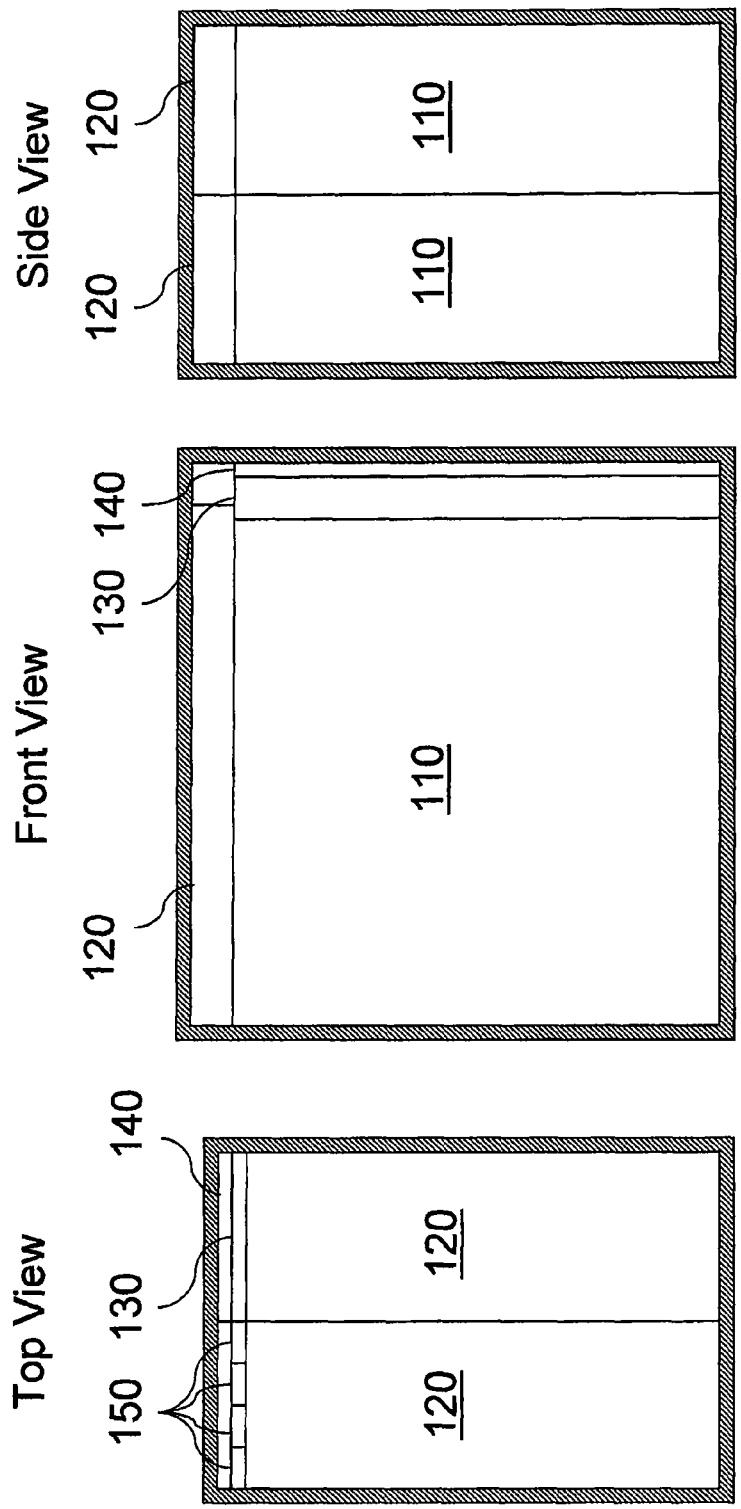
FIGS. 1D-1F illustrate a top, front, and side views of an exemplary configuration for packaging the components of the evaporative cooler media assembly of FIGS. 1A-1C in the form of a kit.

As illustrated in FIGS. 1D-1F, the exemplary media assemblies 100 of the present invention may be assembled in the form of a packaged kit. It is desirable that the media kits of the present invention use the lowest number of components necessary to service the evaporative coolers. This may facilitate easier manufacturing, installation, packaging, and lower costs for producing the exemplary media kits. In the exemplary embodiments described above, media assembly 100 may consist only of the components described above.

It is further desirable that the exemplary media kits of the present invention service the largest number of differently-sized openings. This may enable the exemplary media kits to be usable in conjunction with a wider number of evaporative coolers. In the exemplary embodiments described above, media assembly 100 may be usable for servicing, or providing replacement media to substantially fill, evaporative coolers having openings of at least three different sizes. It will be understood that the exemplary media kits disclosed herein may be usable to service more evaporative coolers based on the sizing and number of components contained in the media kits.

It is also desirable that the exemplary media kits of the present invention include components that are compact in size. For example, while openings of evaporative coolers may be greater than 3 feet wide, it is desirable that replacement media components be smaller. This may facilitated compact packaging of the media kits, and may enable easier installation. In the exemplary embodiments described above, the main media components may be sized such the they are easily manipulated. Additionally, the main media components may each have the same dimensions, and be sized such that the longest side of one of the main media components is no shorter than the length of any side of any of the other components of the media kit. FIGS. 1D-1F illustrate an exemplary configuration for compact packaging of the components of media assembly 100 in the form of a kit (e.g., to be contained in a box or package).

Figure 2:
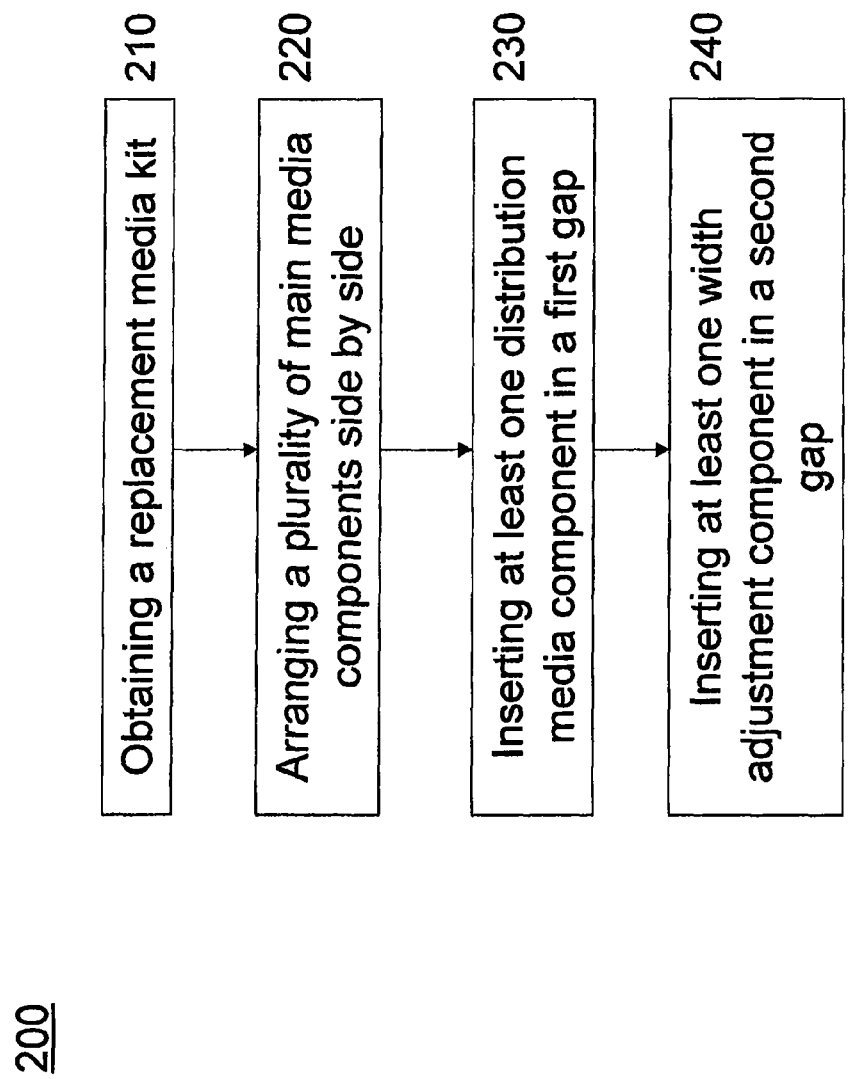
FIG. 2 is a flow chart illustrating an exemplary method of installing replacement media in an evaporative cooler in accordance with aspects of the present invention.

FIG. 2 shows a flow chart of a method of installing replacement media in an evaporative cooler, generally referenced by numeral 200, in accordance with an aspect of the present invention. As described above, the evaporative cooler may include a frame defining an opening for receiving the replacement media. Broadly, method 200 includes the steps of obtaining a replacement media kit, arrange a plurality of main media components, inserting a plurality of distribution media components in a first gap, and filling a second gap with at least one width adjustment component. Additional details of method 200 will be provided herein with reference to the components of media kit 100.

In step 210, a replacement media kit is obtained. In an exemplary embodiment, media kit 100 is obtained. Media kit 100 includes a plurality of main media components 110, a plurality of distribution media components 120, and a plurality of width adjustment components, i.e., first and second width adjustment components 130 and 140.

In step 220, the plurality of main media components is arranged in the opening. In an exemplary embodiment, main media components 110 are arranged side by side within the opening of the frame of the evaporative cooler.

In step 230, at least one of the plurality of distribution media components is inserted in a first gap. In an exemplary embodiment, a first gap extends between a top surface of the main media components 110 and a top of the frame of the evaporative cooler. At least one of the plurality of distribution media components 120 is inserted into the first gap. Optionally, the at least one distribution media component is selected such that the selected distribution media component substantially fills the first gap in the height direction of the opening. Unselected distribution media components, if any, may be unused or discarded.

In step 240, at least one of the plurality of width adjustment components is inserted in a second gap. In an exemplary embodiment, a second gap extends between a side surface of the main media components 110 and a side of the frame of the evaporative cooler. At least one of the first and second width adjustment components 130 and 140 is inserted into the second gap. Optionally, the at least one of the first and second width adjustment components is selected such that the selected width adjustment component substantially fills the second gap in the width direction of the opening. Unselected width adjustment components, if any, may be unused or discarded.

Method 200 may further include the step of positioning at least one height adjustment component in the opening of the evaporative cooler. In an exemplary embodiment, media kit 100 includes a plurality of height adjustment components 150. At least one of the plurality of height adjustment components 150 is positioned at the bottom of the opening of the frame. The main media components 110 may then be placed on top of the at least one height adjustment components 150, in order to decrease or eliminate the size of the first gap.

The above-described kits and methods are directed to providing replacement media for an evaporative cooler. Suitable evaporative coolers may receive media from any of the embodiments of exemplary media kit 100 Replacement media may be installed in the opening of a suitable evaporative cooler using method 200. Exemplary evaporative coolers for use with the above-described kits and methods include, for example, MASTERCOOL evaporative coolers provided by AdobeAir, Inc.; AEROCOOL evaporative coolers from Phoenix Manufacturing, Inc.; and MASTERCOOL or ULTRACOOL evaporative coolers from Essick Air, Inc, and Champion Cooler Corporation. Other suitable evaporative coolers will be known to one of ordinary skill in the art from the description herein.

EXAMPLES

The below examples illustrate media kits that are usable to provide replacement media to a plurality of evaporative coolers. The dimensions for each component are listed based on the orientation of that component in the opening of each evaporative cooler. The dimension for each component are shown in inches. It will be understood that the below media kits are illustrated for the purposes of example only.

| Media Kit 1 | | | | | |
|---|---|---|---|---|---|
| | Component Type | Quantity | Height | Width | Depth |
| Media Kit 1 | Main Media Components | 2 | 22⅛ | 20 | 8 |
| | Distribution Media Components | 2 | 1 | 20¼ | 8 |
| | First Width Adj. Components | 2 | 22⅛ | ½ | 8 |
| | Second Width Adj. Component | 1 | 22⅛ | ¾ | 8 |
| | Height Adjustment Components | 4 | ½ | 20 | 2 |

Media Kit 1 includes 2 main media components, 2 distribution media components, 2 first width adjustment components, 1 second width adjustment component, and 4 height adjustment components. The main media components are formed from notched 6560/15 cellulose media provided by Munters, for example, although it could be manufactured by other manufacturers. For example, the 6560 media has a flute height of 65 mm and a 60 degree angle between the flutes. This type of media has cellulose paper which is fluted. To look at the side of the paper it looks like a sine wave. Several of these papers are glued together alternating between the different angle orientations, in this case to 60 degrees from each other. Other media may have different flute height or angle. Generally, the lesser the flute height the more efficient it will be, but it will restrict the airflow more.

The distribution media components are formed from 5090 cellulose media provided by Munters. The 5090 media is a cellulose media similar to the 6560, but with a 50 mm flute height and a 90 degree difference between the orientation of the alternating flutes on the paper.

The width adjustment components and height adjustment components are formed from STYROFOAM foam.

Media Kit 1 is usable to provide replacement media for the MASTERCOOL® MC43/44; CMC431; CMC432; CMC441; and CMC442 provided by AdobeAir, Inc.; the MASTERCOOL® or ULTRACOOL ADA/ASA/AUA51, ADA/ASA/AUA50, 50 series ULTRACOOL COMPLETE, 51 series ULTRACOOL COMPLETE/MASTERCOOL CONTRACTOR provided by Champion Cooler and EssickAir; and the AEROCOOL TD/TH4800 and TD/TH4801 provided by Phoenix Manufacturing, Inc.

| Media Kit 2 | Component Type | Quantity | Height | Width | Depth |
|---|---|---|---|---|---|
| Media Kit 2 | Main Media Components | 2 | 27⅞ | 20 | 8 |
| | Distribution Media Components | 2 | 1 | 20½ | 8 |
| | Distribution Media Components | 2 | 1⅞ | 20¼ | 8 |
| | First Width Adj. Components | 2 | 27⅞ | ½ | 8 |
| | Second Width Adj. Component | 1 | 27⅞ | ¾ | 8 |

Media Kit 2 includes 2 main media components, 4 distribution media components, 2 first width adjustment components, and 1 second width adjustment component. The main media components are formed from notched 6560/15 cellulose media provided by Munters. The distribution media components are formed from 5090 cellulose media provided by Munters. The width adjustment components are formed from STYROFOAM foam.

Media Kit 2 is usable to provide replacement media for the MASTERCOOL MC63/64; CMC631; CMC632; CMC641; CMC642; MC651; and CMC652 provided by AdobeAir, Inc.; the MASTERCOOL® or ULTRACOOL ADA/ASA/AUA71; ADA/ASA/AUA70; 70 series ULTRA COMPLETE; 71 series ULTRACOOL COMPLETE/MASTERCOOL CONTRACTOR provided by Champion Cooler and EssickAir; and the AEROCOOL TD/TH/TUP6800 and TD/TH/TUP6801 provided by Phoenix Manufacturing, Inc.

| Media Kit 3 | Component Type | Quantity | Height | Width | Depth |
|---|---|---|---|---|---|
| Media Kit 3 | Main Media Components | 2 | 22⅛ | 20 | 12 |
| | Distribution Media Components | 2 | 1 | 20¼ | 12 |
| | First Width Adj. Components | 2 | 22⅛ | ½ | 12 |
| | Second Width Adj. Component | 1 | 22⅛ | ¾ | 12 |
| | Height Adjustment Components | 4 | ½ | 20 | 2 |

Media Kit 3 includes 2 main media components, 2 distribution media components, 2 first width adjustment components, 1 second width adjustment component, and 4 height adjustment components. The main media components are formed from notched 6560/15 cellulose media provided by Munters. The distribution media components are formed from 5090 cellulose media provided by Munters. The width adjustment components and height adjustment components are formed from STYROFOAM foam.

Media Kit 3 is usable to provide replacement media for the MASTERCOOL HC43/44; CHC431; CHC432; CHC441; and CHC442 provided by AdobeAir, Inc.; the MASTERCOOL® or ULTRACOOL ADA/ASA/AUA5112; ADA/ASA/AUA5012; 5012 series ULTRACOOL COMPLETE; 5112 series ULTRACOOL COMPLETE/MASTERCOOL CONTRACTOR units provided by Champion Cooler and EssickAir; and the AEROCOOL TD/TH4812(V2) provided by Phoenix Manufacturing, Inc.

| Media Kit 4 | Component Type | Quantity | Height | Width | Depth |
|---|---|---|---|---|---|
| Media Kit 2 | Main Media Components | 2 | 27⅞ | 20 | 12 |
| | Distribution Media Components | 2 | 1 | 20½ | 12 |
| | Distribution Media Components | 2 | 1⅞ | 20¼ | 12 |
| | First Width Adj. Components | 2 | 27⅞ | ½ | 12 |
| | Second Width Adj. Component | 1 | 27⅞ | ¾ | 12 |

Media Kit 4 includes 2 main media components, 4 distribution media components, 2 first width adjustment components, and 1 second width adjustment component. The main media components are formed from notched 6560/15 cellulose media provided by Munters. The distribution media components are formed from 5090 cellulose media provided by Munters. The width adjustment components are formed from STYROFOAM foam.

Media Kit 4 is usable to provide replacement media for the MASTERCOOL® MC63/64; CMC631; CMC632; CMC641; CMC642; CMC651; and CMC652 provided by AdobeAir, Inc.; the MASTERCOOL® or ULTRACOOL ADA/ASA/AUA71; ADA/ASA/AUA70; 70 series ULTRACOOL COMPLETE; 71 series ULTRACOOL/COMPLETE/MASTERCOOL CONTRACTOR provided by Champion Cooler and EssickAir; and the AEROCOOL TD/TH/TUP6800 and TD/TH/TUP6801 provided by Phoenix Manufacturing, Inc.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A media kit for providing replacement media for use in a plurality of evaporative coolers, each evaporative cooler having a frame defining an opening for receiving the replacement media, at least two of the evaporative coolers having openings of different sizes, the kit comprising:
   a plurality of main media components, at least two of the main media components being configured to be received side by side within the opening of the frame in each of the evaporative coolers;
   a plurality of distribution media components, each of the distribution media components being configured to be positioned on top of the main media components within the opening of the frame in at least one but not all of the evaporative coolers;
   a first width adjustment component configured to fill a gap between a side surface of one of the main media components and a side of the frame in at least one but not all of the evaporative coolers; and
   a second width adjustment component configured to fill a gap between a side surface of one of the main media components and a side of the frame in at least one but not all of the evaporative coolers, the second width adjustment component having a width different from a width of the first width adjustment component,
   wherein a width of each of the main media components is greater than the widths of the first and second width adjustment components.

2. The media kit of claim 1, wherein
the media kit consists of the plurality of main media components, the plurality of distribution media components, the first width adjustment component, and the second width adjustment component.

3. The media kit of claim 2, wherein
the media kit is usable for providing replacement media to evaporative coolers having openings of at least three different sizes.

4. The media kit of claim 1, further comprising:
a height adjustment component configured to fill a gap between a bottom surface of at least one of the main media components and a bottom of the frame in at least one of the evaporative coolers.

5. The media kit of claim 4, wherein
the media kit consists of the plurality of main media components, the plurality of distribution media components, the first width adjustment component, the second width adjustment component, and the height adjustment component.

6. The media kit of claim 5, wherein
the media kit is usable for providing replacement media to evaporative coolers having openings of at least three different sizes.

7. The media kit of claim 1, wherein
the first width adjustment component comprises a plurality of first width adjustment components configured to fill a gap between a side surface of the first width adjustment component and a side of the frame in at least one but not all of the evaporative coolers, each of the plurality of first width adjustment components having the same width.

8. The media kit of claim 7, wherein
the media kit consists of the plurality of main media components, the plurality of distribution media components, the plurality of first width adjustment components, and the second width adjustment component.

9. The media kit of claim 8, wherein
the media kit is usable for providing replacement media to evaporative coolers having openings of at least three different sizes.

10. The media kit of claim 1, wherein
each of the main media components has the same dimensions, and
a length of a longest side of one of the main media components is no shorter than a length of any side of the plurality of distribution media components, the first width adjustment component, and the second width adjustment component, thereby facilitating compact packaging of the media kit.

11. The media kit of claim 1, wherein
the plurality of main media components and the plurality of distribution media components comprise paper or cellulose evaporative media.

12. The media kit of claim 1, wherein
the first and second width adjustment components comprise foam.

13. The media kit of claim 1, wherein
the plurality of main media components are sized such that the plurality of main media components fill a smallest of the openings of the evaporative coolers.

14. The media kit of claim 1, wherein
a depth of each of the distribution media components is the same as a depth of each of the main media components.

15. The media kit of claim 1, further comprising a plurality of height adjustment components configured to fill a gap between a bottom surface of at least one of the main media components and a bottom of the frame in at least one of the evaporative coolers,
wherein a height of each of the main media components is greater than a height of each of the plurality of height adjustment components.

16. The media kit of claim 15, wherein the plurality of height adjustment components comprises at least two height adjustment component for each of the plurality of main media components.

17. The media kit of claim 15, wherein a depth of each of the main media components is greater than a depth of each of the plurality of height adjustment components.